United States Patent [19]

Takata et al.

[11] 4,162,812
[45] Jul. 31, 1979

[54] ROTARY BEARING ASSEMBLY

[75] Inventors: Toshiyasu Takata, Onomichi; Akira Takata, Ibaraki; Shinsuke Tsukumo, Ikeda, all of Japan

[73] Assignee: NTN Toyo Bearing Company, Ltd., Osaka, Japan

[21] Appl. No.: 862,041

[22] Filed: Dec. 19, 1977

[51] Int. Cl.² .................. F16C 19/12; F16C 33/72
[52] U.S. Cl. ........................... 308/172; 308/36.1; 308/169; 308/237 R
[58] Field of Search ............. 308/36.1, 36.4, 135, 308/140, 141, 148, 149, 150, 151, 152, 153, 154, 155, 156, 161, 163, 164, 165, 168, 169, 172, 187.1, 228, 237 R, DIG. 13; 57/129, 133; 19/294, 295

[56] References Cited

U.S. PATENT DOCUMENTS 3,438,191  4/1969  Kuznetsov et al. ................. 308/152

FOREIGN PATENT DOCUMENTS

842143  6/1952  Fed. Rep. of Germany .......... 308/172
685689  1/1953  United Kingdom .................... 308/152

Primary Examiner—Charles E. Frankfort
Attorney, Agent, or Firm—Armstrong, Nikaido, Marmelstein & Kubovcik

[57] ABSTRACT

A rotary bearing assembly which comprises a cup-like cylindrical cell member A, a shaft member G having an end adapted to engage with the bottom of the cylindrical cell member to support thrust loads applied from the outside and a groove for receiving a ring F which supports thrust loads applied from the inside, a bearing member B fitted between the shaft member and the cylindrical cell member, a two-piece split sleeve C interposed between the shaft member and the cylindrical cell member, the split sleeve being injection-molded or pressed into a desired shape, a two-piece split sealing element E, and an annular slipping-off-preventive member D which also serves for sealing purposes, there being formed in the interior a lubricating oil reservoir LC and a sealing chamber SC.

9 Claims, 15 Drawing Figures

ROTARY BEARING ASSEMBLY

BACKGROUND OF THE INVENTION (a) Field of the Invention

The present invention relates to a rotary bearing assembly used mainly with a two-spindle, centrally pressing type top roller used in the draft part of a spinning machine. Not only is it concerned with a bearing construction for a pressing top roller used in the draft part of a textile machine, such as a spinning machine, but broadly it is also concerned with a rotary bearing assembly of the sealed type generally used in the field of textile machinery and in other similar fields.

(b) Description of the Prior Art

The leakage of lubricating oil (including grease) enclosed in the bearing part of a conventional rotary wheel not only shortens the period for replenishing the lubricating oil and complicates the maintenance but also shortens the life of the bearing and forms a major cause of damage and seizure.

In the case of textile machinery, besides the above, said leakage causes other undesirable phenomena including the entry of dust and the rolling-in or twining of fly, which entails the fouling of the product and the formation of knob yarn. As a result, the vicious circle of sucking-out of oil by fly→running short of oil→seizure can hardly be cut off. Generally, as a measure therefor, it is usual practice to provide oil seals. However, so long as pressing top rollers used in textile machinery are concerned, the measure using oil seals has the disadvantage of fibers entering the seals under the action peculiar to fly, often making impossible the cell rotation of the top rollers. Therefore, the labor cost and time loss incurred in cleaning and oiling heretofore periodically performed are very high.

Accordingly, the development of a high performance top roller which requires no maintenance is one of the important needs long pending among engineers concerned.

SUMMARY OF THE INVENTION

The present invention relates to a rotary bearing assembly which comprises a cup-like cylindrical cell member A, a shaft member G having an end adapted to engage with the bottom of the cylindrical cell member to support thrust loads applied from the outside and a groove for receiving a ring F which supports thrust loads applied from the inside, a bearing member B fitted between the shaft member and the cylindrical cell member, a two-piece split sleeve C interposed between the shaft member and the cylindrical cell member, the split sleeve being injection-molded or pressed into a desired shape, a two-piece split sealing element E, and an annular slipping-off-preventive member D which also serves for sealing purposes, there being formed in the interior a lubricating oil reservoir LC and a sealing chamber SC.

FEATURES OF THE INVENTION

The present invention, which is intended to meet the desire described above, has for its object the provision of a sealed type rotory bearing assembly which is free from leakage of lubricating oil, stable in operation and requires no maintenance, by persuing a peculiar rotary bearing assembly by a very novel, unique method breaking away the conventional design concept. The basic principles achieved by the present invention are as follows.

First, a space which is sufficiently as wide as can be allowed from the standpoint of design is allocated to an oil chamber LC, which is placed in a sealed condition isolated from the outside by a system utilizing the characteristics of oil itself to provide an ideal sealed chamber for lubrication and oil storage. All the bearing section (including rotation and thrust supports) requiring lubrication is disposed in said chamber, assisting in the circulation of oil by relative rotation controlled by a sleeve construction inside the cell A and an arbor shaft G extending through the center of said bearing section, thereby immersing it in an optimum environment so as to maintain a desirable lubricated condition. On the other hand, a wide space which occupies about half the volume of the cell A partitioned by a bearing member B is used as a seal chamber SC, serving mainly as an oil slinging chamber and as a chamber for preventing the entry of dust and fly which would otherwise enter the chamber from the outside. At the same time, it also makes use of the sealing function of lubricating oil itself so as to heighten the sealing effect of the oil chamber LC.

Secondly, as the core of the rotary bearing assembly, the shaft member G is disposed substantially at the middle of the cell, so that most of the load is supported by this member G, while the role of prevention of sway and support of thrust applied in one direction is played by an auxiliary bearing part Z formed at the bottom plate wall of the cell A on the closed side. In addition, at this portion an auxiliary bearing of small capacity on the same conditions may be separately provided according to the need.

Further, for prevention of thrust in the opposite direction (i.e., in the direction in which the cell slips off), a construction is employed which makes use of a bearing member slipping-off-preventive ring F. In addition, all these bearing function portions are built up inside the oil chamber LC and immersed in the lubricating oil in the oil chamber, thus providing an ideal environment for effectively maintaining the proper performance as a bearing.

Thirdly, a split formation method for a spacer sleeve C which is the main element in the core construction in a rotary bearing assembly is employed to greately increase the freedom of the versatile design of the interior of the seal chamber, with the result that with the spacer sleeve C formed by this system, the various elements constituting the bearing core are housed in put-together relation with the bearing part B as the core, the assembly being then closely fitted in the cup-like cylindrical cell A having a bottom surface on one side and forming the outer shell construction, whereupon it is stably fixed in position inside the cell chamber, thereby providing a rotary bearing assembly in which said cell chamber is divided by the partition construction comprising the bearing member B as the core to provide two chambers, i.e., the oil chamber LC and the seal chamber SC.

Fourthly, for an object for which it is desirable to elastically support the bearing member B depending upon selection of the material and cross-sectional shape of the sleeve C in order to employ an arrangement in which the split type sleeve C, C' serving as a spacer forming the intermediate shell for support of the bearing part B is interposed, it is very easily achieved and practicable to provide the desired elastic characteristic if the split type formation method according to the invention is employed. Further, considerably sophisticated measures can be taken in connection with circularity, self-aligning performance and sway-preventive characteristic.

Thus, the present invention comprises the various characteristics described in the above four principles, which synergistically act on each other to eliminate almost all the various drawbacks inherent in the conventional bearing assembly, thereby providing a long-awaited rotary bearing assembly particularly useful as a rotary bearing for pressing top rollers, which assembly is superior in various characteristics, such as oil retention, oil leakage prevention, protection against dust, circularity, self-alignment and prevention of sway and vibrations and has greately improved durability, and easiness of maintenance and operation.

DESCRIPTION OF THE PREFERRED EMBODIMENTS

Figures 1, 2, 3:
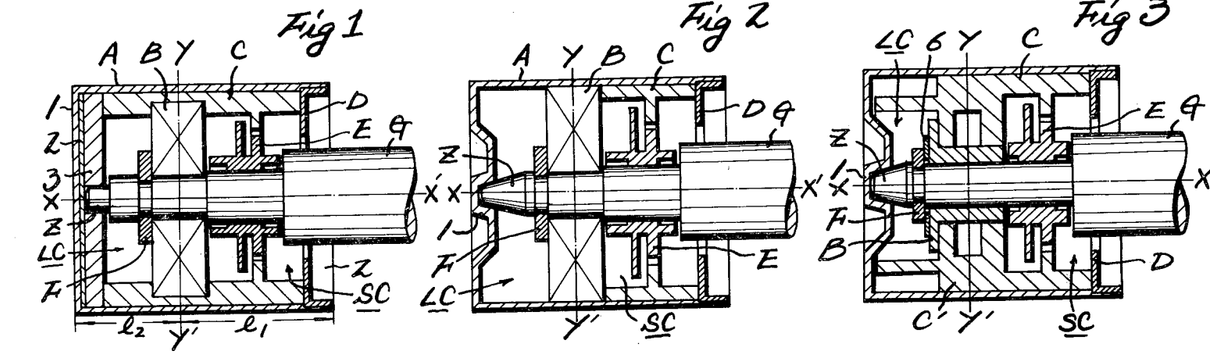
FIG. 1 shows an embodiment of the present invention illustrating the principle of the invention.
FIG. 2 illustrates another embodiment of the present invention.
FIG. 3 illustrates still another embodiment of the present invention.

FIGS. 1 through 3 are views for concretely explaining the principles of the present invention.

In FIG. 1, the character B designates a bearing member, a general example of which is a rolling contact bearing defined in the Japanese Industrial Standards (JIS).

On both sides of the center line YY' of the bearing member B positioned at the middle of the chamber of a hollow cylindrical cell A, there are outer walls at distances 1 and 2 defining two chambers, a seal chamber SC and an oil chamber LC, with the bearing member B serving as a central partition wall. An arbor G which is a rotary base shaft is positioned so that its center line is aligned with the center axis XX' of the cell A. The inner race of the bearing member B is press-fitted on the arbor at a predetermined position at the shoulder of the arbor and its slipping off is prevented by a thrust support ring F. The front end surface of the arbor G disposed adjacent the oil chamber LC is loosely fitted in an auxiliary bearing portion Z in the illustrated form so that it is in a plain bearing support condition over both axial and radial surfaces.

For a high speed, high load and high precision demand, it is preferable to attach a separate auxiliary bearing member (3, 3' in FIG. 1) to the bottom of the cell A, as shown in FIG. 1. From the standpoint of the reduction of manufacturing cost, however, it is preferable to make use of the bottom plate surface of the cell A, as shown in FIGS. 2 and 3. Since they are the same in principle, the systems shown in FIGS. 2 and 3 are also illustrated in the following figures.

In FIG. 1, an intermediate shell, i.e., sleeve C which serves as a spacer is interposed between the outer periphery of the bearing member B and the cell A and the components A, B, C and G fitted together so that the center axes of these cylindrical bodies are in perfect alignment with the main center line XX', to constitute a bearing intermediate assembly having the center line XX' in common.

What is important as a new problem in this construction is that we have completed a technique for forming the split sleeve C so that its peripheral surface holding the bearing is uniform in thickness.

The results of our researches have shown that a satisfactory degree of precision can be attained.

In addition, it is apparent from FIG. 1 that the axial position of the bearing member B is determined by the dimensional accuracy of the region 11 of the split sleeve C.

Figure 4A:
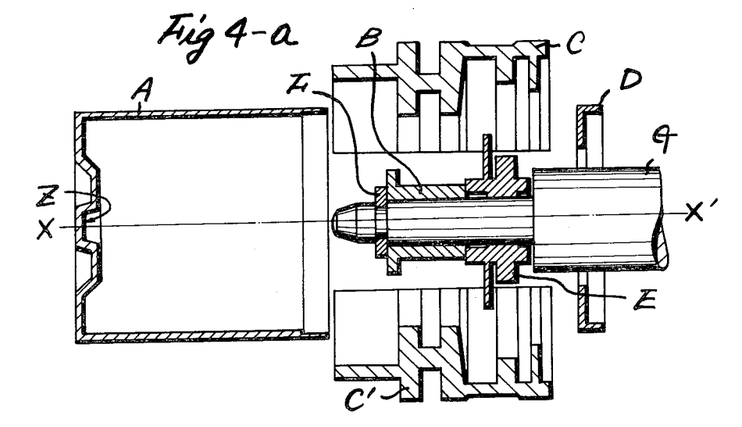
FIG. 4 illustrates still another embodiment of the present invention.
Figure 4B:
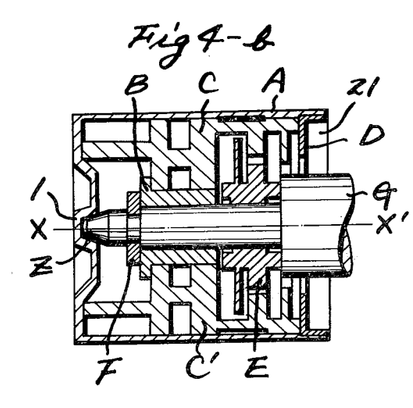
Figures 5A, 5B:
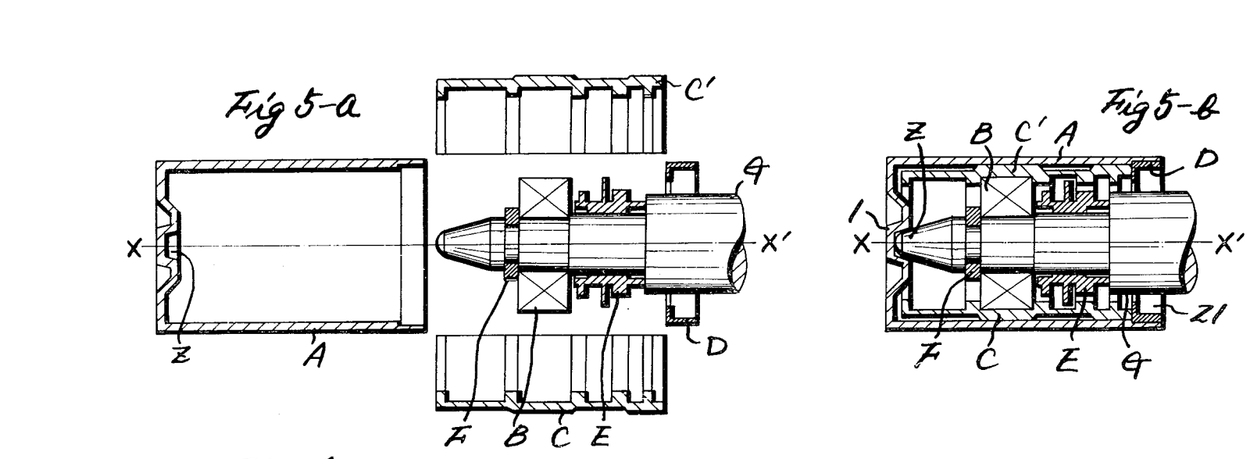
FIG. 5 illustrates still another embodiment of the present invention.

For this reason, in assembling the rotary bearing construction, as shown in FIGS. 4 and 5, after the bearing inermediate assembly is housed in the cell A, a closure-purpose-slipping-off-preventive ring D is fitted and fixed at a predetermined position on the open side of the cell A.

A seal element E is disposed on the portion of the arbor G associated with the seal chamber SC for the purpose of forming a seal structure needed to achieve the slinging of oil and the prevention of entry of dust and fly from the outside. This will be later described in more detail.

As is apparent from the basic views shown in FIGS. 1 through 3, during the operation of the pressing roller, the thrusts which are produced in the horizontal direction along the axis X-X' between the arbor G and the cell A is supported in such a manner that the thrust in one direction is supported by the region of contact between the front end surface of the arbor G and the inner surface of the bottom plate 1 at the auxiliary bearing part 2 while the thrust in the opposite direction is supported by the surface of contact between the bearing member B and the thrust support ring F. The proper clearance between the two is maintained by the dimension $l_1$ of the split sleeve C.

The above relation determines the positional relation of the combination of the arbor G and cell A. In the seal chamber SC, it engages with the arbor G and the seal element E is disposed to surround the periphery thereof. The seal element E plays an important role in forming the seal chamber SC and its outer peripheral shape corresponds to the inner surface shape of the portion of the sleeve C belonging to the seal chamber SC and cooperates with it to form a specific seal construction. In addition, the inner surface construction of the sleeve C positioned in the oil chamber LC is such as to improve the circulation of oil through all the bearing parts needing oil retention and lubricating oil.

The relation between the bearing member B and the sleeve C shown in FIG. 2 is such that in an example in which the basic construction shown in FIG. 1 is applied to a special case, the outer periphery of the bearing member B is closely fitted directly in the cell A. For example, when the outer diameter of the cell is determined by standards and standard bearings are used, the construction shown in FIG. 2 is used if it happens that it is not allowed to provide the necessary wall thickness of the portion of the sleeve C existing on the outer periphery of the bearing.

FIG. 2 shows an example in which the wall thickness of this portion of the sleeve C is omitted out of necessity.

FIG. 3 shows a principle view when a plain bearing system is used for the bearing member B. For example, an oil-containing metal provided by powder metallurgy or a dry metal in the form of synthetic resin is used. The cross-sectional construction of the sleeve C is given special features on the basis of the basic principles of the present invention fully described in connection with FIG. 1 so that it is most suitable to these metals. That is, one of the features of this cross-sectional construction is that a space portion, as illustrated, meeting the need is defined and is used as an oil retention chamber and oil slinging chamber using felt or the like and at the same time use is made of the vibration absorbing effect over a radial and axial extent of the bearing support section depending on the elastic characteristic of said portion, aiming at the improvement of the overall performance of the rotary bearing assembly. Other features of the construction are the same as in the basic view shown in FIG. 1.

On the basis of the concept of the principle views of the present invention shown in FIGS. 1, 2 and 3, the invention will now be described in more detail with reference to embodiments thereof in which it is applied to a pressing top roller used in textile machinary.

FIGS. 4 and 5 are exploded and assembled views, in section, of the components of a rotary bearing assembly based on the basic principles of the invention.

FIG. 4 shows a form using a plain bearing member B.

FIG. 5 shows a form using a rolling contact bearing B.

In FIG. 4, (a) shows the disposition of all the components prior to assembly and also shows how they are assembled, while (b) shows a sectional view of the rotary construction after assembly.

That is, in (a), the core assembly positioned at the middle is constructed by using, with an arbor G as a center shaft, a seal element E, a bearing member B and a thrust support ring F, as illustrated.

A sleeve C, C' split into two is arranged to surround the core assembly. Thus, they are integrated by being put together, thereby constituting an intermediate shell assembly.

The same is then closely fitted in the cell A, as shown in FIG. 4 (b), so that the auxiliary bearing portion Z at the front end surface of the arbor G is received in an auxiliary bearing portion provided at the middle of the bottom of the cell A, with a predetermined clearance defined between the front end surface of the arbor and the inner surface of the bottom plate 1.

FIG. 5 shows a construction, which is the same in principle as the one shown in FIG. 4 but which differs therefrom in the form of the bearing member B and the sleeve C holding the same.

That is, the bearing member B in FIG. 5 is a general bearing according to the JIS.

This type is used mainly for high speed pressing roller bearings. That is, it is used where conditions for increased rotative accuracy to reduce eccentricity and sway and for torque reduction are strictly required. For example, it is used for pressing top rollers used in the draft part of a textile machine.

In these cases, considerably severe accuracy is required for the wall thickness of the sleeve C interposed between the outer race of the bearing and the cell A.

It has been proved that judging from the present-day level of synthetic resin molding technique, this requied degree of accuracy can be attained. Therefore, sufficient possibility of mass-production according to this system has been substantiated. In addition, we have developed a special working method which is capable of meeting requirements on a specially high level of accuracy.

Figure 6:
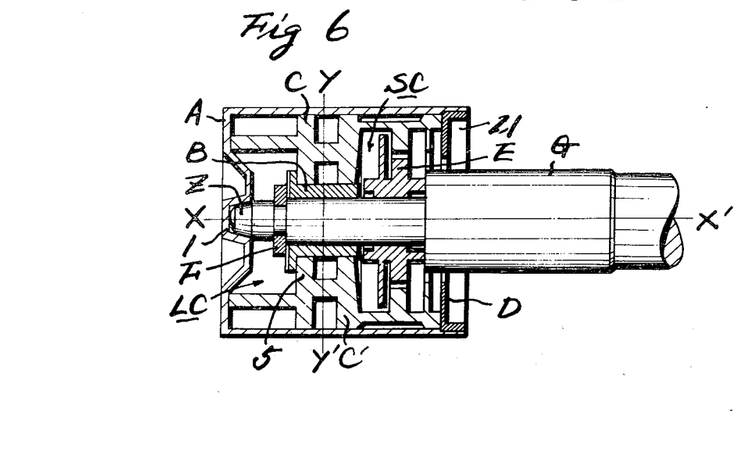
FIG. 6 illustrates still another embodiment of the present invention.
Figure 7:
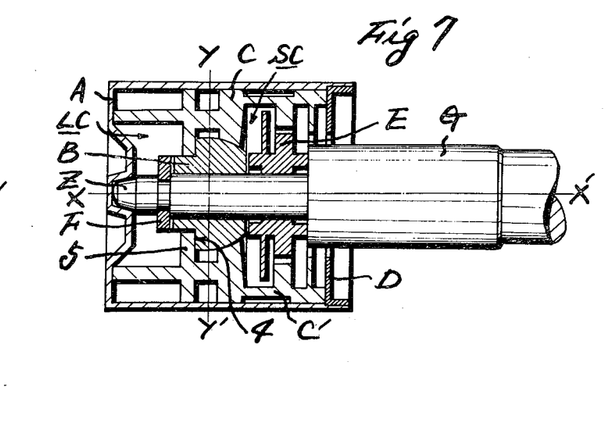
FIG. 7 illustrates still another embodiment of the present invention.

While the foregoing refers to the main features of the basic form according to the present invention, typical embodiments of the invention will now be described with reference to FIGS. 6 through 13. FIGS. 6 and 7 show embodiments wherein plain bearing forms, such as oil-containing alloys and dry metals, are used for the bearing member B.

FIG. 6 shows an example using a flange type bearing while FIG. 7 shows an example using a mushroom type bearing.

The features of these embodiments lie in the H-shaped cross-sectional construction of the sleeve C, C' holding the bearing member B. This portion forms a partition wall construction bisecting the chamber of the cell A substantially at the middle of the latter and enhances the effect of sealing the oil chamber LC by the peculiar elasticity of the construction, while a pocket portion formed at the intermediate region plays the dual role of an oil reservoir and oil slinger by its own oil film forming phenomenon.

Figure 8:
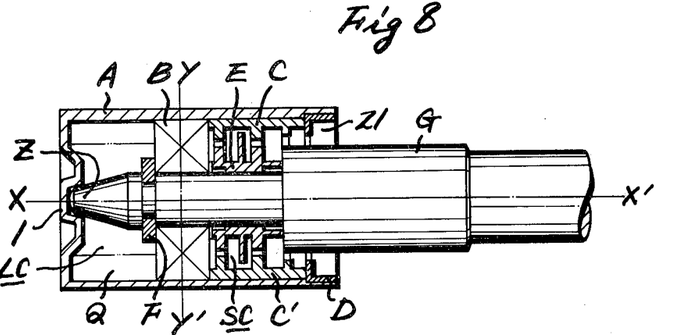
FIG. 8 illustrates still another embodiment of the present invention.
Figure 9:
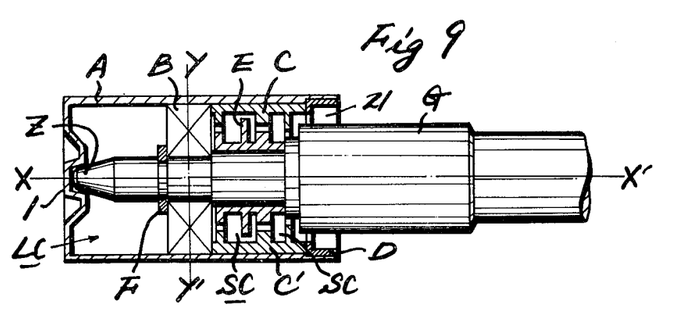
FIG. 9 illustrates still another embodiment of the present invention.

Particularly in the case of the mushroom type bearing system shown in FIG. 7, a bearing part 5, while holding the bearing part as a fixed position, has the function of performing the proper elastic retention of it against the pressing surface 4 of the bearing member B, maintaining the peculiar self-aligning action of the mushroom type bearing while fully exerting a vibration absorbing effect, thereby protecting the metal from improper wear. This improves the subtle bearing characteristics of the surface of contact between the arbor G and the bearing member B, thus contributing much to the increase of the bearing life. This is one of the features of the present invention which can be more or less extended to all the types using metals. FIGS. 8 and 9 show embodiments using a rolling contact type bearing member B according to the Jis, i.e., a general bearing. What is common with these embodiments is that the outer surface of the outer race of the bearing member B is closely fitted directly in the cell A. In this connection, the sleeve C cooperates with the contained seal element E to form a seal chamber construction while serving as a spacer for positioning the bearing part B.

Figure 10:
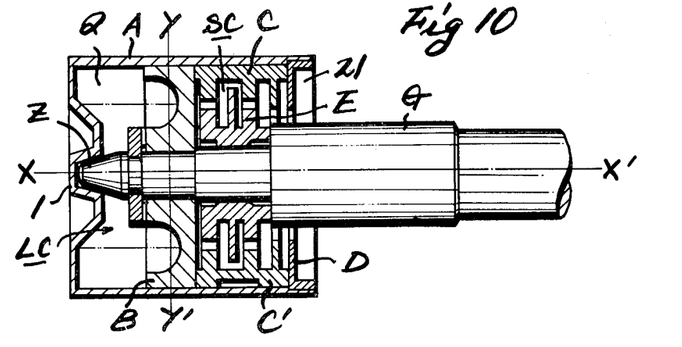
FIG. 10 illustrates still another embodiment of the present invention.

FIG. 10 shows another embodiment using a bearing member B made of an oil-containing alloy.

The amount of oil to be replenished is increased by making as wide as possible the oil receiving surface of the bearing member B in the oil chamber. Such retaining system provided by direct fitting between the bearing member B and the cell A as illustrated in FIGS. 8 through 10 is used for a rotary bearing of the type in which there is no need to attach great importance to the vibration absorbing capability.

Figure 11:
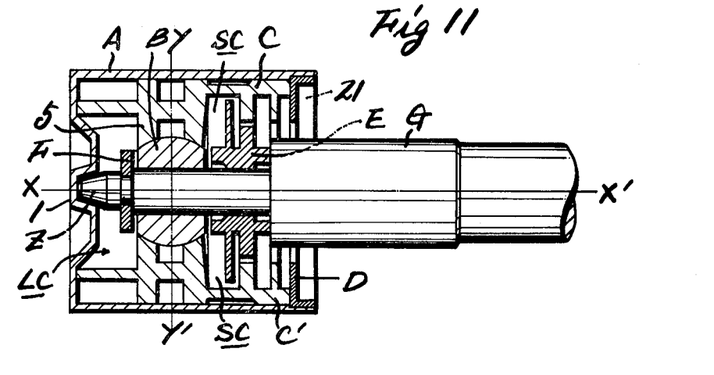
FIG. 11 illustrates still another embodiment of the present invention.

FIG. 11 shows an embodiment using a spherical bearing. When applied to a rotary bearing needing the same rotary axis self-alignment as in the mushroom type bearing system shown in FIG. 7, it is useful for improving the bearing performance.

Figure 12:
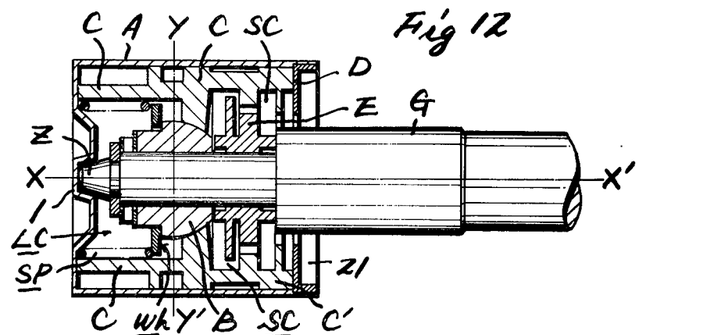
FIG. 12 illustrates still another embodiment of the present invention.

FIG. 12 shows another embodiment using a mushroom type bearing member B, illustrating a form in which a washer Wh and a spring SP are used to hold the bearing member B by urging it against the bearing holding surface of the sleeve C under a predetermined elastic force. This is the most preferable, normal, bearing holding method for the mushroom type bearing support system.

The system shown in FIG. 7 uses a split body reconstructing formation method for the production of the sleeve C and the elastic holding ring 5 used in said system serves to maintain the same function of the form shown in FIG. 12, thereby simplifying the latter form.

Figure 13:
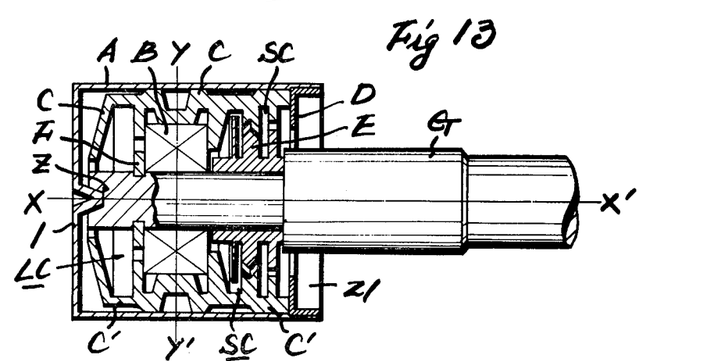
FIG. 13 illustrates still another embodiment of the present invention.

A form shown in FIG. 13 is one giving priority to behavior and circulation wherein the firm, vibration absorbing, support construction for the bearing member B is harmonized with lubricating oil in the oil chamber.

In the present invention, a rotary bearing assembly is constituted by rotary wheel supporting elements, such as a cell A, a bearing member B, an auxiliary bearing portion Z, a sleeve C, ka closing-purpose slipping-off-preventive ring D, a seal element E, a thrust support ring F and an arbor G, said seal element E and bearing member B being fitted on the shoulders on the arbor G which is the support shaft for the rotary body (in some cases, the arbor may become a rotary body).

In a system using a rolling contact type bearing, it is usual practice to properly press-fit the inner race of the bearing on the shaft. When the force for this press-fit can be increased, there are cases where the thrust support ring F is unnecessary. In the embodiments of the invention, however, the thrust support ring F is fitted in the groove formed in the arbor G to prevent the slipping-off of the bearing member B and support the trust which is produced in the direction of the axis X—X.

The bearing core thus assembled is assembled with the split sleeve member C, C' in closely fitted relation in a space which receives the bearing member B, so as to surround the main functioning part forming the bearing core of the rotary body, and in this condition it is fitted in the cylinder of the cell A, thereby forming a perfectly integrated, closely fitted assembly.

Thus, the front end surface of the arbor G is brought into end-to-end engagement with the center recess Z of the bottom plate 1 of the cell A in a pivot fashion.

Therefore, it resists the thrust acting in the direction X-X' of the cell A, serving as thrust support sway-preventive means in a condition maintaining the strict clearance relation.

The rotation-resistant torque on the rotary body at the front end surface of the arbor is almost zero because of aligned contact.

In this condition, the oil chamber LC for lubrication is ingeniously defined by the three elements, i.e., the sleeve C, bearing member B and bottom plate 1 of the cell A, and coupled with the formation of oil films around the periphery of the bearing member, it becomes an almost closed oil chamber almost completely isolated from the outside.

As a result, phenomena such as oxidation or denaturing of lubricating oil can hardly occur, contributing much to the prolongation of the bearing life. On the other hand, as for the construction of the seal chamber SC, with the bearing member B as the boundary line, it is disposed side by side with the oil slinging construction for the lubricating oil whichmmoves from the inside to the outside, and thus also serves as a construction for preventing the entry of fly and dust. The elements which constitute the same are mainly the three elements, the sleeve C, seal element E and closing-purpose slipping-off-preventive ring D, with the cell A and arbor G assisting them.

Our test results have shown that with this seal construction, almost all the oil that leaks is blocked by the first chamber, with substantially no oil reaching the second chamber.

Therefore, the invention makes it possible to eliminate the leakage of oil found in conventional top rollers.

As for the construction for preventing the entry of dust and fly, our test results have shown that the rolling-in and entry of fly has a close relationship to the size of the clearance between the cell A and the outer periphery of the arbor G at the inlet on the open side of the cell A and also to the depth of the overhanging pent roof of the cylinder of the cell A and that this relationship has an optimum region within fixed limits.

It has been ascertained that in the selection of such clearance, the characteristics of raw cotton to be used, especially the staple length and fineness, and oiling have predominant influences and it does not necessarily follow that a minimum clearance gives the best result.

In these tests, the fly almost stopped in the vicinity of said pent roof, none being found to enter the cell A. Therefore, it has become also possible to eliminate the phenomenon of oil being sucked out as found in conventional top rollers.

As for the relation between the cell A and arbor G which are the most important portions of the rotary assembly, the portions which are put together and received in the oil chamber LC and which need sufficient lubricating oil, i.e., the bearing member B, the auxiliary bearing portion Z of the arbor G, the surface of contact between the thrust support ring F and the bearing member B, and the bearing supporting shoulders on the arbor G are always immersed in the lubricating oil while maintaining proper clearances. Thus, the invention meets the conditions needed for extremely stably maintaining desirable lubricating performance.

Further, according to the invention, when the assembly is applied to a pressing top roller, concerning the thrusts produced in the direction of the rotary axis X—X, the thrust acting inwardly (toward the arbor) on the cell A is supported by the contact point on the front end surface of the arbor G whose surface speed is very low while the opposite thrust load is supported by the thrust support ring F of small diameter immersed in the oil in the oil chamber, so that in either case the torque resistance is very low.

Further, the closure-purpose slipping-off-preventive ring D plays an important direct role in stably maintaining the relative positions and related functions of the components of the rotary bearing assembly and the clearance between the fly entry preventing chamber defined by its pent roof and the peripheral surface of the arobor G prevents the entry of dust, especially fly.

If necessary, an O-ring of predetermined diameter extending around the inner peripheral surface of the cell A may be inserted in a clearance between the closure-purpose slipping-off-preventive ring D and the split sleeve C to complete the oil seal function.

As described above, the versatile form design for functionally holding various types of bearing members B is a technique which can be achieved only by the split formation method. By materially or structurally imparting a property (which, in some cases, may be springiness) characteristic of an elastic body to the cross-sectional construction of the retaining portion for the bearing member B supported by the sleeve C, as represented by the portion 5 in FIG. 7, the invention has made it possible to produce a novel rotary bearing assembly having a springily holding-down function, a vibration absorbing function and the dual function of an oil reservoir and an oil slinger. This not only prolongs the life of the rotary bearing assembly but also contributes much to the impartation of a characteristic which hardly produces vicious circle-like phenomena such as eccentricity, sway and so-called chattering, which are drawbacks inherent in conventional rotary bearing assemblies.

The most striking feature of the invention is that versatility in the combined construction in the interior of the cylindrical cell A has been achieved by newly developing a perfect type reconstructing production method making use of the spacer sleeve C according to a plit formation method. Thereby, the measure for preventing the entry of dust in the seal chamber SC and the leakage of oil from the oil chamber LC has been almost perfected.

This enhanced performance, coupled with the rationalization of the design and construction of the oil chamber LC, has made it possible to enclose a small amount of oil (including grease) and maintain the best lubricating conditions for all the bearing regions for a long time without denaturing the oil. Further, the production and assembly of related parts are facilitated, thereby opening up a way for reducing the cost of mass-production.

Further, the sleeve C itself can be easily formed to have a versatile cross-sectional construction by a split formation method, and as can be seen in the sectional view of the cell A, the inner construction of the cylindrical cell A is firmly supported on both sides by the bottom plate 1 and the closure ring D and its central portion is supported by the partition wall construction with the bearing member serving as the core.

That is, these three are in their proper positions, forming a truly circular beam construction. This serves to maintain the circularity of the cell A accurately for a long time.

Since the clearance between the bearing core and the inner surface of the cell A is filled by the free selective design of the cross-sectional shape of the sleeve, a bearing member which is most appropriate to the load can be used without restrictions on the outer diameter of the cell A. As a result, it has become possible to obtain a rotary construction which is highly accurate, light in weight and rugged.

The merits of the rotary construction according to the present invention may be summarized as follows.

(a) It is rugged and hardly causes the leakage of oil, the twining of fly and the entry of dust, and lubricating oil is enclosed by the sealed construction, so that it withstands prolonged use and oil shortage, seizure and other troubles and damage due to fly and dust as found in the prior art are drastically reduced.

Oiling and maintenance operations are not needed for a long time or at least the intervals of such operations can be greately increased.

As a result, most of the troubles in the use of conventional top rollers are eliminated and the fouling of products with oil which has heretofore often aroused controversy is substantially eliminated.

(b) The oiling interval of 6,000-8,000 hours in conventional to rollers is extended by about 5-10 times and the effect of labor saving brought about by the achievement of a maintenance-free feature can be expected.

(c) The simple construction and easy production make it possible to greatly reduce the production cost of top rollers.

Particularly, the production of main parts on a press and the standardization of bearing members contribute much to productivity.

(d) The accuracy of individual parts can be easily maintained. Moreover, the use of an elastic construction as the intermediate shell produces a remarkable effect in terms of shock resistance, sway absorption property and vibration absorbability, thereby prolonging the life of the bearing.

(e) Since the effective oil slinging and fly entry preventing construction improves the anti-dust effects, there will be no troubles such as the twining of cotton and seizure due to the sucking-out of oil, as found in conventional top rollers.

(f) Since the circulation of lubricating oil is smoothly and thoroughly effected under favorable conditions, the wear of the bearing can be minimized, and rugged, durable high performance top rollers can be mass-produced at relatively low cost.

(g) Thrusts produced on the top roller in either direction along the axis X-X' can be coped with under favorable conditions, and the phenomenon in which the cell displaces, as found in the past, is eliminated. Further, the share of the thrust which the bearing must bear is minimized. The chattering and rotative sway of the cell caused by increases in the transverse clearance due to the wear of the bearing member B, as found in the past, can be eliminated by the system according to the invention.

It is because of the reliable support system at both end surfaces of the arbor G. That is, it is solely because the auxiliary bearing system based on the auxiliary bearing portion Z attached to the bottom plate surface of the cell A produces an effect which frees the bearing member B from too much burden.

(h) High precision grinding of the rubber covering on the cell can be performed by a simple method without disassembling the cell or needing a special holder jig, as in the past.

(i) When it is desired to replace the covering this can be effected without the need of removing the cell.

(j) The throwaway system may be used from the standpoint of economy.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. A rotary bearing assembly comprising a cylindrical cell member having a bottom and an opposed open end, a shaft member having a groove and an end adapted to engage with the bottom of said cylindrical cell member to support thrusts applied from the outside of said cell member, a ring received in said groove for supporting thrust loads applied from the inside of said cell member, a bearing member fitted between said shaft member and said cylindrical cell member, a two-piece split sleeve positioned within and adjacent to said cylindrical cell member, a two-piece split sealing element positioned between said split sleeve and said shaft member on the side of said bearing member facing the open end of said cell member, and an annular slipping-off prevention and sealing member positioned about said shaft member at the open end of said cell member, and wherein said bearing member divides the interior of said cell member into a lubricating oil reservoir and a sealing chamber 2. A rotary bearing assembly having an oil slinger and dust seals, said assembly comprising a cylindrical cell, the inner space of said cylindrical cell having one end closed by a bottom plate and the other end open, a bearing member forming a partition wall for dividing the interior of said cell into two chambers, thereby providing an oil reservoir chamber on the closed side for storing lubricating oil and a seal chamber on the open side for preventing oil leakage and dust entry, an arbor having the same center axis as the cell and supporting the bearing member for rotation in the portion of the arbor immersed in the oil in the oil chamber, said arbor having an auxiliary shaft end bearing portion supported at the middle of the inner surface of the bottom plate of the cell such that the end surface of the arbor can be urged against it, a thrust support ring mounted on said arbor to counteract thrusts acting in a direction toward said open end, wherein said auxiliary shaft end bearing portion and said thrust support ring are positioned in the oil chamber, a seal means comprising an uneven, undulating annular form provided on the inner peripheral surface of the cell, a shoulder on the arbor opposed thereto and a seal element mounted on said shoulder and having an uneven, undulating annular form mating with that of said seal means, said seal means, shoulder and seal element being located in said seal chamber, thereby preventing the leakage of lubricating oil from the oil chamber and the entry of fly and dust from the outside.

3. A rotary bearing assembly as set forth in claim 2 wherein said sealing means comprises a split type spacer sleeve having at least two sleeve portions, said sleeve portions having a form such that when said portions are put together and received in said cell, they form a completely integrated structure, and wherein said sleeve and said bearing member form an intermediate shell structure, which is then closely fitted in said cylindrical cell, and the open side of the cell is closed by a slipping-off-preventive ring received therein.

4. A rotary bearing assembly as set forth in claim 3 wherein said split sleeve is formed of a member having a predetermined elastic property and is shaped into an elastic cross-section making use of the characteristics of the split formation, thereby imparting a predetermined elasticity to the holding construction for the bearing member and holding the bearing member in a vibration-absorbing elastic manner.

5. A rotary bearing assembly as set forth in claim 2 wherein the bearing member is of a flange type bearing using a plain bearing form.

6. A rotary bearing assembly as set forth in claim 3 wherein said bearing member is a mushroom type bearing, said assembly including a water and a spring to urge the bearing member against the bearing holding surface of the sleeve to hold the same.

7. A rotary bearing assembly as set forth in claim 2 including a separate auxiliary bearing member to loosely receive the auxiliary shaft end bearing portion of the arbor therein.

8. A rotary bearing assembly as set forth in claim 2 wherein the bearing member is a of a mushroom type bearing using a plain bearing form.

9. A rotary bearing assembly as set forth in claim 2 wherein the bottom surface of the cell includes a recess therein for loosely receiving the auxiliary shaft and bearing portion of the arbor.

* * * * *